United States Patent [19]

Naylor et al.

[11] 4,256,853

[45] Mar. 17, 1981

[54] NONLAMINATING POLYPHENYLENE ETHER BLENDS

[75] Inventors: Floyd E. Naylor; Roy F. Wright, both of Bartlesville, Okla.

[73] Assignee: Phillips Petroleum Company, Bartlesville, Okla.

[21] Appl. No.: 74,275

[22] Filed: Sep. 11, 1979

[51] Int. Cl.$^3$ ............... C08L 25/10; C08L 53/02; C08L 71/04
[52] U.S. Cl. .................. 525/92; 525/68; 525/71
[58] Field of Search ............... 525/92, 68, 71

[56] References Cited

U.S. PATENT DOCUMENTS

| 3,660,531 | 5/1972 | Lauchlan et al. | 525/92 |
| 3,920,770 | 11/1975 | Nakashio et al. | 525/152 |
| 3,994,856 | 10/1976 | Katchman et al. | 525/92 |
| 4,080,403 | 3/1978 | Gergen et al. | 525/92 |
| 4,097,550 | 6/1978 | Haaf et al. | 525/92 |
| 4,123,410 | 10/1978 | Lee | 525/92 |
| 4,139,574 | 2/1979 | Cooper | 525/108 |
| 4,143,095 | 3/1979 | Lee | 525/68 |
| 4,148,771 | 4/1979 | Nash | 525/314 |
| 4,166,055 | 8/1979 | Lee | 260/30.6 R |

*Primary Examiner*—Carman J. Seccuro

[57] ABSTRACT

Lamination problems in polyphenylene oxide resin blends with conjugated diene-monovinylarene rubber polymers are avoided or minimized by using a linear or radial conjugated diene-monovinylarene teleblock copolymer having monovinylarene end blocks having a high heterogeneity index.

15 Claims, No Drawings

NONLAMINATING POLYPHENYLENE ETHER BLENDS

FIELD OF THE INVENTION

The invention relates to polymer blends comprising polyphenylene ether resins and copolymers of conjugated dienes and monovinylarenes. In another aspect the present invention relates to the modification of polyphenylene ether resin compositions with a copolymer of monovinylarenes and conjugated dienes. In accordance with yet another aspect, the invention relates to the blend of polymers consisting essentially of one or more polyphenylene oxides and one or more polymers of monovinylarenes and one or more copolymers of monovinylarenes and conjugated dienes.

BACKGROUND

The polyphenylene ether resins are a family of engineering theromplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metalamine complex catalyst.

U.S. Pat. No. 3,356,761 discloses such polyphenylene oxides which are dissolved in styrene monomer and the styrene monomer subsequently polymerized into polystyrene to produce a mixture of polyphenylene oxide and polystyrene.

U.S. Pat. Nos. 3,373,226 and 3,383,435 disclose mixtures of polyphenylene oxide and a styrene resin.

U.S. Pat. Nos. 3,660,531 and 3,920,770 disclose polyphenylene oxide, or styrene resin modified-polyphenylene oxide, and a rubbery polymer, such as, for example, a butadiene-styrene block copolymer, said blends having unexpected thermoplastic properties.

U.S. Pat. Nos. 4,139,574 and 4,143,095 describe compositions comprising polyphenylene oxide and butadiene-styrene teleblock copolymers. Impact strength and surface gloss are mentioned as improved properties of articles molded from such compositions in these patents.

Although the incorporation of rubbery copolymers into polyphenylene oxide compositions has been found to be desirable to improve certain properties of such compositions one typically encounters further problems. Specifically, lamination effects in compositions of polyphenylene oxide and rubbery polymers constitute a serious problem. Lamination is undesirable since it causes weakness of molded articles and can cause surface blemishes (undesirable surface appearance). The lamination is believed to relate at least partially to the incompatibility of the rubbery copolymer and the polyphenylene oxide. This is evidenced by a layered-structure appearance which is most evident at a fractured edge. This problem has now been solved in accordance with this invention by the incorporation of a linear or radial rubbery teleblock copolymer into the polyphenylene oxide composition, which teleblock copolymer has blocks of polymerized monovinylarene at the free ends of the polymer chains, said blocks having a high heterogeneity index.

It is thus one object of this invention to provide a thermoplastic polymer blend with improved properties, particularly with improved lamination properties.

A further object of this invention is to provide a polyphenylene oxide composition having good mechanical properties such as tensile and impact strength rendering it useful as an engineering resin and having no serious lamination problems.

Yet, another object of this invention is to provide a blend of polyphenylene oxide and rubbery polymers with good heat distortion and tensile properties at elevated temperatures.

Other objects, aspects, advantages, features and embodiments of this invention will become apparent to those skilled in the art from the following description and the appended claims.

STATEMENT OF THE INVENTION

In accordance with this invention a thermoplastic polymer blend is provided which comprises polyphenylene oxide, a teleblock copolymer as defined in the following, and optionally a monovinylarene resin. It has been surprisingly discovered that the lamination problem in compositions comprising polyphenylene ether resins and rubber polymers can be efficiently eliminated or minimized by incorporating the specific rubbery polymer to be defined into the composition.

For the following it should be understood that whenever one polymer as a constituent of the composition is defined that also a mixture of two or more of such polymers following under the given definition are encompassed.

In a further embodiment of this invention, polymer blends are provided consisting essentially of polyphenylene oxide, a teleblock copolymer to be defined, a styrene resin as well as optionally one or more of the usually employed polymer additives.

A polymer composition comprising poly(2,6-dimethyl-1,4-phenylene oxide), a teleblock butadiene-styrene copolymer and polystyrene is particularly preferred.

A specific advantage of the compositions of this invention resides in the fact that relatively low molecular weight copolymers of monovinylarenes and conjugated dienes can be utilized in the composition while lamination problems are still efficiently prevented or minimized. In case a hydrogenated copolymer is used in the composition of this invention the matter is of particular significance since hydrogenation of low molecular weight polymers is much to be preferred to the hydrogenation of high molecular weight polymers since lower solution viscosity provides for more convenient and efficient hydrogenation and recovery.

The compositions and blends of this invention can be used essentially in the same way as known polyphenylene ether compositions. Specifically, the composition can be used as a thermoplastic engineering resin, e.g., in injection molding, compression molding or for the formation of fibers or films. Typically these compositions can be molded into small appliance housings.

TELEBLOCK COPOLYMER

The teleblock copolymer useful in the composition of this invention can be structurally described by the following formulae

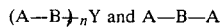

wherein A represents a block of polymerized monovinylarene, B represents a block of polymerized conjugated diene, Y represents the residue of a polyfunctional coupling agent, and n is an integer of at least 2 and can be (ideally) equal to the number of active sites on the polyfunctional coupling agent. Generally n will be in the range of 2 to about 6. Furthermore and importantly, the heterogeniety index (a measure of molecular weight distribution) of the polymerized monovinylarene portion A of the teleblock copolymer is considerably greater, as a result of the incremental addition of the monovinylarene and the polymerization initiator, than the heterogeniety index of the polymerized monovinylarene portion of the teleblock copolymer prepared by single increment addition of monovinylarene and initiator, whereas the heterogeniety index of the total teleblock copolymer is not appreciably correspondingly different for the copolymers prepared in the two different procedures. This has previously been disclosed in U.S. Pat. No. 4,148,771.

Conjugated dienes useful in the preparation of these teleblock copolymers are generally those containing 4 to about 12 carbon atoms per molecule, preferably those containing 4 to about 8 carbon atoms per molecule. Specific examples of useful conjugated dienes include 1,3-butadiene, isoprene, 2,3-dimethyl-1,3-butadiene, piperylene, 3-butyl-1,3-octadiene, 2-phenyl-1,3-butadiene, and the like, and mixtures thereof. Especially preferred is 1,3-butadiene due to its availability and favorable cost.

The monovinylarene monomers which are employed with the above-described conjugated dienes for forming the teleblock copolymers include those containing from 8 to about 20 carbon atoms per molecule. Examples of specific monovinylarene monomers include styrene, 2-methylstyrene, p-vinyltoluene, p-t-butylstyrene, and the like, and mixtures thereof. Presently preferred is styrene due to its availability.

The teleblock copolymers suitable for use in the blends of this invention will generally contain conjugated diene and monovinylarenes in the amounts within the range of about 90:10 to about 50:50 parts by weight of conjugated diene:monovinylarene, preferably about 80:20 to about 60:40.

Any organomonolithium initiator known in the art can be used to initiate polymerization of the conjugated diene and monovinylarene to produce the teleblock copolymers suitable for use in this invention. Those hydrocarbyllithium compounds containing from 1 to about 20 carbon atoms are generally useful. Examples of such initiators include methyllithium, n-propyllithium, isopropyllithium, n-butyllithium, sec-butyllithium, tert-butyllithium, n-decyllithium, n-eicosyllithium, phenyllithium, p-tolyllithium, cyclohexyllithium and the like. In addition to lithium initiation other monofunctional initiators such as potassium and sodium initiators can be used.

The amount of initiator used will be varied, depending upon the desired molecular weight of the resultant copolymer. The teleblock copolymers suitable for use in this invention can vary broadly from relatively low molecular weight rubbers of about 50,000 number average molecular weight up to those having a molecular weight of 1,000,000 or more. However, preferably the teleblock copolymers will have a number average molecular weight of about 70,000 to about 150,000 after coupling. These molecular weights referred to are obtained by a procedure referred to in footnote a, Table I, Example I. The initiator levels useful in preparing the copolymers are generally in the range of about 0.2 to about 8, preferably 1.2 to about 6 gram millimoles per 100 grams of total monomers.

A polar compound (such as acyclic or cyclic ethers or tertiary amines) is preferably employed in the polymerization of the conjugated diene and monovinylarene in order to increase the rate of polymerization. Diethyl ether, tetrahydrofuran and tetramethylethylenediamine are among those frequently used in amounts ranging from about 0.01 to about 100, preferably from about 0.05 to about 10 parts by weight per 100 parts by weight of monomer.

Use of a hydrocarbon diluent is much to be preferred in the polymerization process for ease in mixing and for temperature control. Common diluents which are well known in the art to be useful in solution polymerization processes include n-hexane, n-heptane, cyclohexane, cyclopentane, benzene, toluene, and the like and mixtures thereof. A reasonable range of amount of diluent that can be used is about 50–2,000 parts by weight per 100 parts by weight of monomer.

The polymerization process of this invention involves the incremental addition of both organomonolithium initiator and monovinylarene. In other words, a portion of the total monovinylarene and a portion of the organolithium initiator are mixed with the diluent in the reactor. After the initial monovinylarene charge polymerizes to the desired degree, the remainder of monovinylarene and initiator is added to the reactor in at least one more increment, but in as many increments, as desired. This incremental addition of both initiator and first monomer provides much greater control over the reaction than could be obtained by incremental addition of only the initiator.

It is generally desirable to employ from about 10 to about 90 weight percent of the monovinylarenes preferably about 25 to about 75 weight percent, and from about 10 to about 60 mole percent of the initiator, preferably about 20 to about 55 mole percent, in the initial polymerization step. It is preferable to then employ the remainder of the monovinylarene and initiator in the second polymerization step. After this polymerization, conjugated diene is introduced into the unquenched polymerization system and is allowed to polymerize.

The polymerization process is generally carried out at temperatures in the range of about $-25°$ to about $150°$ C., preferably about $25°$ to about $125°$ C. It is especially convenient to employ a process in which essentially adiabatic conditions are maintained; i.e., the heat liberated by the polymerization reaction is not removed by use of internal or external cooling devices, but the temperature of the polymerization system is allowed to rise until the polymerization reaction is essentially complete and the temperature of the system then decreases.

If desired, the reaction system can be maintained under positive pressure, which pressure can be applied either by the addition of an inert gas, such as nitrogen, or by only the vapor pressures of the components of the reaction system. Convenient pressures can be in the range of about 50 to about 10,000 kPa and preferably and more conveniently in the range of about 50 to about 800 kPa.

Polymerization times will generally be determined by the temperature, as well as by the reactivities of the components. Normal polymerization times will generally be in the range of about 0.1 minute to about 24 hours and preferably about 1 minute to about one hour.

At the conclusion of the polymerization reaction, a polyfunctional coupling agent (containing at least two reactive sites) is added to the unquenched reaction mixture to produce the coupled copolymer. This agent must be added before any material such as water, acid or alcohol is added. The temperature of the coupling reaction can vary over a wide range and is conveniently the same as that used for polymerization. At normal polymerization temperatures, i.e., above about 25° C., the coupling reaction occurs rapidly, i.e., in the range of several seconds to about 1 hour.

It is within the scope of this invention to use teleblock copolymers as defined in which the block of polymerized monovinylarene having the high heterogeneity index has been generated by other means than incremental initiator/monomer addition. One other possibility to achieve this is to prepare at least two separate quantities of living polymerized monovinylarene, at least two of these quantities having substantially different average molecular weights. These separate quantities of living polymers either before or after the polymerization of the conjugated diene containing portion B of the polymer chain are mixed together. The final living polymer mixture containing living polymer chain A—B—L are then coupled to form the block copolymers $(A-B)_n Y$ useful in the compositions of this invention. L originates from the initiator and can be, e.g., Li.

The multifunctional coupling agents which are added to the polymerization mixture after completion of the polymerization reaction include those multiepoxides, multiisocyanates, multiimines, multialdehydes, multiketones, multianhydrides, esters, multihalides, compounds containing more than one of these functional groups or any other coupling agents which are described in the art.

In order to achieve maximum coupling, ideally the optimum amount of polyfunctional coupling agent to be employed will be that amount of coupling agent which contains one gram-equivalent of coupling agent for each gram-equivalent of lithium-terminated polymer molecules. In other words, each reactive functional site in the coupling agent will react with one carbon-lithium bond in the living polymer. Any given agent may demonstrate an effective functionality which is less than theoretical, but it is the actual reacting sites which are considered in determining functionality. When equivalent amounts of the polyfunctional coupling agent and the living polymer are contacted, the resulting final product is either a linear polymer when using a difunctional agent or a radial polymer (in which three or more polymer chains extend radially from the centralized coupling agent residue) when using an agent having 3 or more functional groups. It may sometimes be desirable to employ an excess of coupling agent such as up to 125 mole percent in excess of the stoichiometric amount of coupling agent.

A currently convenient process for preparing the teleblock copolymers of the invention is as follows. Care must be taken to exclude moisture or oxygen from the polymerization system. A portion of the monovinylarene and the diluent in a suitable reactor are maintained at the desired temperature for initiation of polymerization. Introduction of a portion of the organomonolithium compound initiates the polymerization of the monovinylarene monomer. At least one more portion of both the monovinylarene and initiator are added to the reaction vessel, and polymerization is allowed to proceed. After completion of the monovinylarene polymerization, conjugated diene monomer is introduced into the unquenched polymerization system. After completion of the polymerization of conjugated diene monomer, the difunctional or polyfunctional coupling agent is added. When the coupling reaction is complete, if any carbon-lithium remains it can be inactivated by addition of water, alcohol or acid. The resultant teleblock copolymer is then isolated by any suitable means well known in the art, such as coagulation by alcohol or steam-stripping of volatiles, followed by appropriate drying procedures.

It is believed that the incremental addition of both the initiator and of the monovinylarene broadens the molecular weight distribution (and thus raises the heterogeneity index) of the monovinylarene portions of the produced copolymers without producing an appreciable corresponding increase in the heterogeneity index of the total polymer. The range of heterogeneity index of the monovinylarene portions of the copolymer which would be within the scope of the invention is about 1.2 to about 3.0 and the preferred range is about 1.2 to about 2.0. The heterogeneity index of the total copolymer in this invention will generally lie within the range of about 1.1 to about 1.4. The heterogeneity index of the monovinylarene portions of the copolymer is substantially larger than the heterogeneity index of the total copolymer, substantially larger being defined in this invention as at least about 0.1 units larger.

For control of the reaction, it is desirable to allow the reaction mixture of the first increment of monovinylarene, polar compound (if present), and hydrocarbon diluent (if present) to reach the optimal polymerization temperature before the first increment of initiator is added. Also, for control of the reaction it is desirable that the second and other remaining increments of initiator be put into the reactor either prior to or simultaneous with the second or other remaining increments of monovinylarene.

Teleblock copolymers suitable for use in this invention include those in which the poly(conjugated diene) portion can be non-hydrogenated, partially hydrogenated, or completely hydrogenated. Presently preferred are those teleblock copolymers which have been hydrogenated such that at least about 95 mole percent of the olefinic unsaturation has been removed without removing substantial amounts of aromatic unsaturation.

Hydrogenation can be effected in the presence of a variety of catalyst systems of either the heterogeneous or homogenous type. Examples of suitable heterogeneous catalyst systems include nickel on kieselguhr, Raney nickel, copper-chromium oxide, molybdenum sulfide, and finely divided platinum or noble metals on suitable carriers. Homogeneous catalysts are preferred, however, and the latter can be prepared by reducing a cobalt, nickel, or iron carboxylate or alkoxide with an alkyl aluminum compound. An example of a preferred homogenous catalyst is that formed through the reduction of nickel octoate (nickel $C_8$ carboxylate) by triethylaluminum. The polymer, preferably in solution in an inert solvent, is contacted with the catalyst under conditions which include temperatures in the range from about 0° to about 250° C. and pressurization with hydrogen up to a total pressure of about 7,000 kPa. When treating the polymer in solution, a suitable pressure is that pressure sufficient to maintain the reaction mixture substantially in the liquid phase. The reaction time can vary from about 1 min. to about 25 hours or more. Preferred conditions involve temperatures of about 10° to about 200° C., pressures of about 70 to about 3,500 kPa, and reaction times of about 10 minutes to about 10 hours.

Following the hydrogenation reaction, the hydrogenated polymer can be isolated by conventional techniques. For example, the catalyst components can be converted to water soluble salts and washed from the polymer solution. An antioxidant (such as for example 2,6-di-t-butyl-4-methylphenol) can be added if desired, followed by coagulation of the polymer, filtration or decantation to isolate the polymer, and finally removal of residual solvent under reduced pressure.

POLYPHENYLENE OXIDE

The polyphenylene oxides or polyphenylene ether resins in the compositions of this invention have the repeating structural unit of the general formula:

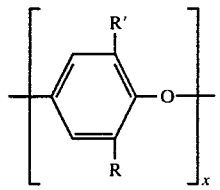

wherein the oxygen atom of one repeating unit is connected to the phenylene nucleus of the next repeating unit, R is a monovalent substituent selected from the group consisting of hydrogen, hydrocarbon radicals free of a tertiary α-carbon atom, halohydrocarbon radicals having at least two carbon atoms between the halogen atom and phenyl nucleus and being free of a tertiary α-carbon atom, and halohydrocarbonoxy radicals having at least two carbon atoms between the halogen atom and phenyl nucleus and being free of a tertiary α-carbon atom; R' is the same as R and may additionally be a halogen; and x may represent any whole integer greater than 100.

Examples of polyphenylene oxides corresponding to the above formula can be found in the above-referenced patents of Hay and Stamatoff. Especially preferred is poly(2,6-dimethyl-1,4-phenylene oxide).

The polyphenylene oxides may be prepared in various ways. One method comprises oxidizing a phenol represented by the formula:

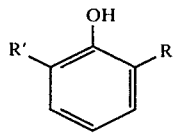

wherein R and R' have the same meanings given above. These phenols are oxidized by passing an oxygen-containing gas through the particular phenol in the presence of a catalyst system comprising a cuprous salt and a tertiary amine.

STYRENE RESIN

In the following, the term "styrene resin" is used to define monovinylarene resins having at least 25 percent, by weight, polymer units derived from the compound having the formula:

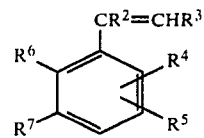

wherein $R^2$ and $R^3$ are selected from the group consisting of hydrogen and lower alkyl or alkenyl groups of from 1 to 6 carbon atoms; $R^4$ and $R^5$ are selected from the group consisting of chloro, bromo, hydrogen, and lower alkyl groups of from 1 to 6 carbon atoms; and $R^6$ and $R^7$ are selected from the group consisting of hydrogen and lower alkyl and alkenyl groups of from 1 to 6 carbon atoms or $R^6$ and $R^7$ may be concatenated together with hydrocarbyl groups to form a naphthyl group.

The term "styrene resin" as used herein includes by way of example, homopolymers such as polystyrene, poly-α-methylstyrene, and poly(chlorostyrene), the modified polystyrenes such as rubber modified polystyrenes, and styrene-containing copolymers such as styrene-chlorostyrene copolymers, styrene-bromostyrene copolymers, styrene-acrylonitrile copolymers, styrene-butadiene copolymers, styrene-acrylonitrile-α-alkylstyrene copolymers, styrene-acrylonitrile-butadiene copolymers, and styrene-maleic anhydride copolymers. In addition, other suitable polymers include graft copolymers of styrene or α-methylstyrene polymerized on a polybutadiene or a butadiene-styrene copolymer, and graft copolymers of styrene or α-methylstyrene with vinyl monomers polymerized on a polybutadiene or a butadiene-styrene copolymer. The styrene resins described above may be prepared using polymerization methods described in such as *Billmeyer's Textbook of Polymer Science*, New York, Interscience Publishers, 1966.

The method of blending the polyphenylene oxide with the styrene resin, when a styrene resin modified-polyphenylene oxide is to be used in the invention composition, is not critical and does not constitute a part of this invention. The preferred method comprises blending the two polymers in powder or granular form, extruding the blend, chopping into pellets and re-extruding.

The polyphenylene oxides and the styrene resins are combinable with each other in all proportions. Consequently, compositions comprising from 1 to 99 percent, by weight, polyphenylene oxide and from 99 to 1 percent, by weight, styrene resin are included within the scope of the invention. In general, compositions containing from 40 to 85 percent polyphenylene oxide and from 60 to 15 percent styrene resin exhibit the best overall combination of properties and these compositions are preferred.

Suitable commercially available styrene resin-modified polyphenylene oxide resins are sold by General Electric under the trademark "Noryl."

BLEND COMPOSITION

The weight ratio of the polyphenylene oxide, alone or in combination with a styrene resin, to hydrogenated or non-hydrogenated conjugated diene-monovinylarene teleblock copolymer can range broadly from 99:1 to 5:95. However, in the preferred composition having high impact strength, the hydrogenated or non-hydrogenated conjugated diene-monovinylarene teleblock copolymer will typically be the minor component of the blend and the polyphenylene oxide, alone or in combination with a styrene resin, will comprise the major portion. The preferred blend composition of this invention will therefore comprise about 30 to about 85 weight percent polyphenylene oxide, about 10 to about 50 weight percent styrene resin, and about 5 to about 25 weight percent hydrogenated or non-hydrogenated conjugated diene-monovinylarene teleblock copolymer. All weight percents are based on total blend composition.

The blends of this composition may contain certain other additives to plasticize, extend, reinforce, fill, lubricate, prevent oxidation, flame retard, dye, pigment, etc., the polymeric composition. Such additives are well known in the art and may be incorporated without departing from the scope of the invention.

BLENDING METHODS

To prepare the blends of this invention the polyphenylene oxide alone or in combination with a styrene resin, and the hydrogenated or non-hydrogenated conjugated diene-monovinylarene teleblock copolymer, and any other additional additives, may be mechanically blended together in the desired proportions with the aid of any suitable mixing device conveniently used for mixing rubbers or plastics, such as for example a differential roll mill, a Banbury mixer, an extruder, or a Brabender Plasti-Corder. In order to facilitate thorough mixing of the polymers and to develop the desired combination of physical properties, the mechanical blending is carried out at a sufficiently high temperature to soften the polymers so that they are thoroughly dispersed and intermingled with each other. The mixing temperature will in general vary with the composition of the teleblock copolymer, the polyphenylene oxide, and the styrene resin. Usually the polyphenylene oxide, which is normally the higher softening material of the composition, will govern the mixing temperature selected. Mixing is continued until an essentially uniform blend is obtained.

Alternatively the polyphenylene oxide and the teleblock copolymer may be solution blended using one or more suitable solvents.

EXAMPLE I

This example illustrates the preparation of hydrogenated 70/30 butadiene/styrene teleblock copolymers by the incremental addition of styrene and n-butyllithium. The preparation of a control teleblock copolymer by the single increment addition of styrene and n-butyllithium is also illustrated.

Teleblock copolymers were prepared according to Recipe I.

Recipe I

|  | Run 1 | Run 2 | Run 3 | Run 4 (control) |
|---|---|---|---|---|
| Step 1 |  |  |  |  |
| Cyclohexane, parts by weight | 780 | 780 | 780 | 780 |
| Styrene, parts by weight | 15 | 15 | 15 | 30 |
| Tetrahydrofuran, parts by weight | 1.0 | 1.0 | 1.0 | 1.0 |
| n-Butyllithium, mhm[a] | 0.8 | 1.0 | 1.2 | 2.0 |
| Polymerization temperature, °C. | 70 | 70 | 70 | 70 |
| Polymerization, minutes | 5 | 5 | 5 | 10 |
| Step 2 |  |  |  |  |
| Styrene, parts by weight | 15 | 15 | 15 | — |

Recipe I-continued

|  | Run 1 | Run 2 | Run 3 | Run 4 (control) |
|---|---|---|---|---|
| n-Butyllithium, mhm[a] | 0.8 | 1.0 | 1.2 | — |
| Polymerization temperature, °C. | 70 | 70 | 70 | — |
| Polymerization time, minutes | 10 | 10 | 10 | — |
| Step 3 |  |  |  |  |
| 1,3-Butadiene, parts by weight | 70 | 70 | 70 | 70 |
| Polymerization temperature, °C. | 70 | 70 | 70 | 70 |
| Polymerization time, minutes | 35 | 35 | 35 | 35 |
| Step 4 |  |  |  |  |
| Epoxidized soybean oil[b], parts by weight | 0.5 | 0.5 | 0.5 | 0.5 |
| Reaction temperature, °C. | 70 | 70 | 70 | 70 |
| Reaction time, minutes | 10 | 10 | 10 | 10 |

[a]mhm- Gram millimoles per 100 grams of monomers.
[b]Paraplex G-62, Rohm and Haas.

The teleblock copolymers were prepared in 26-ounce (about 780 ml) beverage bottles equipped with a perforated crown cap over a self-sealing rubber gasket. Polymerization was conducted under a nitrogen atmosphere, the bottles and the cyclohexane solvent being thoroughly purged with nitrogen prior to polymerization. Following completion of the coupling step (Step 4), 0.1 phm (parts by weight per 100 parts by weight of the monomers) of 2,6-di-t-butyl-4-methylphenol was added to the polymerization reaction mixture as a 10% (weight/volume) solution in 50/50 (by volume) toluene/isopropyl alcohol. A small sample of the reaction mixture was coagulated with excess isopropyl alcohol and the precipitated non-hydrogenated teleblock copolymer recovered by filtration and then dried at about 50° to 60° C. under reduced pressure. Physical properties of the non-hydrogenated teleblock copolymers are shown in Table I.

TABLE I

Physical Properties of Non-hydrogenated Teleblock Copolymers

|  | Run 1 | Run 2 | Run 3 | Run 4 (control) |
|---|---|---|---|---|
| Molecular weight, $M_w$[a] | 134,000 | 109,000 | 93,000 | 90,000 |
| Molecular weight, $M_n$[a] | 113,000 | 93,000 | 82,000 | 79,000 |
| Heterogeneity index of total polymer[b] | 1.19 | 1.17 | 1.13 | 1.14 |
| Heterogeneity index of polystyrene portion[b][e] | 1.4 | 1.4 | 1.4 | 1.1 |
| Inherent viscosity[c] | 1.16 | 1.03 | 0.95 | 0.93 |
| Total styrene, weight percent[d] | 27.7 | 27.6 | 27.7 | 28.4 |

[a]Molecular weights were determined from gel permeation chromatography curves and intrinsic viscosities by a procedure described by G. Kraus and C. J. Stacy, J. Poly. Sci. A-2 10, 657 (1972), and G. Kraus and C. J. Stacy, J. Poly. Sci. Symposium No. 43, 329 (1973).
[b]Heterogeneity index = $M_w/M_n$. The higher the number, the broader the molecular weight distribution.
[c]Inherent viscosity was determined according to a procedure given in U.S. Pat. No. 3,278,508, column 20, note a with the modification that the solution was not filtered through a sulfur absorption tube but rather through a fritted glass filter stick of grade C porosity and pressured directly into the viscometer.
[d]Total styrene present in the copolymer determined by ultraviolet absorption spectroscopy.
[e]Extrapolated from the data given in U.S. Pat. No. 4,148,771, column 7, Table II.

The teleblock copolymers were hydrogenated using a reduced nickel hydrogenation catalyst prepared by the following procedure: a 1 M solution of nickel octoate (nickel $C_8$ carboxylate) in cyclohexane was treated with a 1 M solution of triethylaluminum in cyclohexane in quantities sufficient to give an aluminum/nickel molar ratio of 2/1.

Terminated but non-coagulated polymer cement from the polymerization reaction (80 grams of polymer dissolved in 800 ml of cyclohexane) was transferred under a nitrogen atmosphere into a ½ gallon (about 1.9 liters) capacity glass reactor and the reduced nickel solution described previously added in an amount sufficient to provide about 5 millimoles of nickel (about 0.37 parts by weight nickel per 100 parts by weight polymer). With continuous stirring, hydrogen was added for one hour at a pressure of 345 kPa (gauge) and at a temperature of 30° C. The reaction mixture was then treated with water (50–100 ml) to deactivate the catalyst. Oxygen was then added and the mixture was stirred at 70° C. until the mixture changed to a light gray or green color. The reaction mixture was washed with a 10 percent aqueous solution of phosphoric acid and ammonium phosphate (1:4 weight ratio) and then washed with water. Following the water wash, 2,6-di-t-butyl-4-methylphenol (0.5 parts by weight per 100 parts by weight of parent polymer) was added in about 10 ml of a 50/50 (by volume) toluene/isopropyl alcohol solution. The hydrogenated polymer was isolated by coagulation with isopropyl alcohol and dried under reduced pressure at 50° C.

Infrared analysis showed less than one mole percent of the original unsaturation to be present as residual unsaturation in the hydrogenated copolymers.

EXAMPLE II

This example illustrates a minimal lamination of blends of polyphenylene oxide, polystyrene, and butadiene-styrene teleblock copolymers prepared by incremental addition of styrene and n-butyl-lithium initiator.

Seventy-five parts by weight of poly(2,6-dimethyl-1,4-phenylene oxide) having a weight average molecular weight of about 46,000, fifteen parts by weight polystyrene (Cosden 550, Cosden Oil and Chemical Company), and ten parts by weight of hydrogenated teleblock copolymer were mixed in a C. W. Brabender Plasti-Corder by first charging about three-fourths of the poly(2,6-dimethyl-1,4-phenylene oxide) to the Plasti-Corder (preheated to a jacket temperature of 190° C. and set at a mixing speed of about 15 to 30 rpm), next adding the entire amount of the polystyrene and the hydrogenated teleblock copolymer, adding 1.5 parts by weight of tris(nonylphenyl) phosphite stabilizer (Polygard HR, Uniroyal Chemical (Company), and then adding the remaining one-fourth of the poly(2,6-dimethyl-1,4-phenylene oxide). Following the charging of all ingredients, the mixing speed was increased to 150 rpm, and the blend masticated for 5 minutes. After removing the molten blended polymeric composition from the Plasti-Corder and allowing it to cool and solidify, test specimens were prepared by compression molding at 250° C. using a mold having dimensions of 1.5 inches by 7 inches by 0.125 inch (3.8 cm×17.8 cm×0.32 cm).

Evaluation of lamination was conducted by clamping the test specimen in a fixed position, mechanically gripping the free-standing end of the specimen and flexing it repeatedly through 90° until the specimen broke. The fractured edge of the test specimen was then visually examined for lamination. Lamination was evidenced by a layered-structure appearance of the fractured edge. Each fractured test specimen was rated on an arbitrary scale of 1 to 4 wherein a rating of 1 denotes little or no lamination, and progressing to a rating of 4 which denotes extreme lamination. Each specimen was evaluated and rated independently by two persons.

As a second evaluation of lamination, an approximately ⅛ to ¼ inch (0.32 to 0.64 cm) cut was made in one edge of each test specimen, and the test specimen mechanically gripped on each side of the cut and sufficient force applied to cause the test specimen to tear. Test specimens were rated for degree of lamination by two persons as described earlier for the broken specimens. Lamination rating results are shown in Table II.

TABLE II

Lamination Ratings of Poly(2,6-dimethyl-1,4-phenylene oxide)/ Polystyrene/Hydrogenated Butadiene-Styrene Teleblock Copolymer Blend Compositions

| Lamination | Lamination Rating[a][b] Blend Containing Teleblock Copolymer Prepared In | | | |
|---|---|---|---|---|
| | Run 1 | Run 2 | Run 3 | Run 4(control) |
| At break | 1,1 | 1,2 | 1,1 | 3,3 |
| At tear | 2,2 | 2,2 | 2,3 | 3,3 |

[a]Rating Scale
1 = Little or no lamination
2 = Some lamination
3 = Moderate lamination
4 = Extreme lamination
[b]Rating by each of two persons shown for each sample.
[c]Preparation and properties of the butadiene-styrene teleblock copolymers used in each blend are described in Example I.

These data illustrate the significantly lower lamination of blends containing hydrogenated butadiene-styrene teleblock copolymers prepared by incremental additions of styrene and n-butyllithium (Runs 1, 2, and 3) compared to the blend containing hydrogenated butadiene-styrene teleblock copolymer prepared by single increment addition of styrene and n-butyllithium (control Run 4).

We claim:
1. A composition comprising
   (a) a polyphenylene oxide
   (b) a block copolymer having a number average molecular weight in the range of about 70,000 to about 150,000 and having the formula $(A-B)_nY$ or $A-B-A$, wherein
      A is a block of polymerized monovinylarene having a heterogeneity index of at least 0.1 unit higher than the heterogeneity index of the block copolymer,
      B is a hydrogenated polymer block of polymerized or copolymerized conjugated diene, said block B rendering the block copolymer rubbery;
      Y is a radical from a multifunctional coupling agent
      n is a number of two or more and
   (c) a monovinylarene resin in which at least 25 weight percent of the polymer units are derived from the compound having the formula

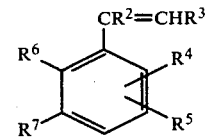

wherein $R^2$ and $R^3$ are selected from the group consisting of hydrogen and lower alkyl or alkenyl groups of from 1 to 6 carbon atoms; $R^4$ and $R^5$ are selected from the group consisting of chloro, bromo, hydrogen, and lower alkyl groups of from 1 to 6 carbon atoms; and $R^6$ and $R^7$ are selected from the group consisting of hydrogen and lower alkyl and alkenyl groups of from 1 to 6 carbon atoms or $R^6$ and $R^7$ may be concatenated together with hydrocarbyl groups to form a naphthyl group.

2. The composition of claim 1 wherein the monovinylarene is styrene and the diene is 1,3-butadiene.

3. The composition of claim 1 wherein said monovinylarene resin is polystyrene.

4. The composition of claim 1 wherein said block copolymer has the formula $(A-B)_nY$.

5. The composition of claim 4 wherein said monovinylarene resin is polystyrene.

6. The composition of claim 1 wherein said polyphenylene oxide (a) is poly(2,6-dimethyl-1,4-phenylene oxide), wherein said block copolymer has the formula $(A-B)_nY$ wherein A is a polystyrene block and B is a polybutadiene block and wherein said monovinylarene resin is polystyrene.

7. A composition comprising
  (A) a block copolymer having a number average molecular weight in the range of about 70,000 to about 15,000 formed by a process comprising
    (1) polymerizing a first quantity of monovinylarene and a first quantity of an essentially monofunctional polymerization initiator to produce a first living polymer mixture,
    (2) adding to this first living polymer mixture at least one further quantity of monovinylarene and at least one further quantity of monofunctional polymerization initiator to produce a further living polymer mixture having a heterogeneity index at least 0.1 unit higher than the block copolymer, the polymer in this further living polymer mixture being described by the formula

A—L wherein A is a block of polymerized monovinylarene and L originates from the monofunctional polymerization initiator,
    (3) adding to said further living polymer mixture at least one additional quantity of monomer comprising a conjugated diene to form a polymer block B attributing rubbery properties to the final polymer and thereby forming a final living polymer mixture, the polymer in this final living polymer mixture being described by the formula

A—B—L (4) coupling the polymer in the final living polymer mixture by contacting it with a multifunctional coupling agent under coupling conditions such as to connect two or more molecules of said polymer A—B—L to form a copolymer described by the formula $(A-B)_nY$ wherein Y is the residue of said multi-functional coupling agent and n is a number of two or more representative of the coupling degree,
    (5) hydrogenating and recovering said teleblock copolymer, and
  (B) a polyphenylene oxide.
  (C) a monovinylarene resin 8. The composition of claim 7 wherein said block copolymer is one that has been hydrogenated to remove essentially all of the olefinic unsaturation from the polymer while leaving the aromatic unsaturation essentially unchanged to form a hydrogenated teleblock copolymer as a portion of that composition.

9. The composition of claim 7 wherein said monovinylarene is styrene and said diene is 1,3-butadiene.

10. The composition of claim 7 further comprising a monovinylarene resin having the formula

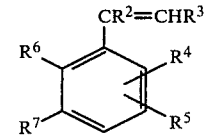

wherein $R^2$ and $R^3$ are selected from the group consisting of hydrogen and lower alkyl or alkenyl groups of from 1 to about 6 carbon atoms; $R^4$ and $R^5$ are selected from the groups consisting of chloro, bromo, hydrogen, and lower alkyl groups of from 1 to about 6 carbon atoms; and $R^6$ and $R^7$ are selected from the group consisting of hydrogen and lower alkyl and alkenyl groups of from 1 to about 6 carbon atoms or $R^6$ and $R^7$ may be concatenated together with hydrocarbyl groups to form a naphthyl group.

11. The composition of claim 10 wherein said monovinylarene resin is polystyrene.

12. The composition of claim 7 wherein A is a polystyrene block and B is a polybutadiene block.

13. The composition of claim 7 wherein the further living polymer mixture is formed by adding one further quantity of monovinylarene and one further quantity of monofunctional initiator to the first living polymer mixture.

14. The composition of claim 10 comprising at least about 30 weight percent polyphenylene oxide and about 5 to about 25 weight percent teleblock copolymer.

15. The composition of claim 14 consisting essentially of
  30 to 85 weight percent polyphenylene oxide,
  10 to 50 weight percent polymonovinylarene,
  5 to 25 weight percent teleblock copolymer, and optionally, usually employed polymer additives, the weight percentages given being based on the total composition.

* * * * *